United States Patent [19]

Mellon

[11] Patent Number: 4,910,521
[45] Date of Patent: Mar. 20, 1990

[54] DUAL BAND COMMUNICATION RECEIVER

[75] Inventor: Donald W. Mellon, Plano, Tex.

[73] Assignee: Texas Instruments Incorporated, Dallas, Tex.

[21] Appl. No.: 289,424

[22] Filed: Aug. 3, 1931

[51] Int. Cl.$^4$ .................. G01S 13/78; H04K 1/10; H04L 9/00

[52] U.S. Cl. ........................... 342/45; 375/114; 380/48

[58] Field of Search ........... 343/6.5 R, 6.5 LC, 6.8 R, 343/6.8 LC; 178/22.17; 370/100, 101; 375/106, 114, 116; 342/45; 380/48

[56] References Cited

U.S. PATENT DOCUMENTS

| | | | |
|---|---|---|---|
| 3,646,580 | 2/1972 | Fuller et al. | 343/6.5 R X |
| 4,112,498 | 9/1978 | Reiner et al. | 370/100 X |
| 4,145,690 | 3/1979 | Petitjean et al. | 343/6.5 R |
| 4,215,239 | 7/1980 | Gordy et al. | 370/100 X |
| 4,278,977 | 7/1981 | Nossen | 343/6.5 LC |

*Primary Examiner*—T. H. Tubbesing
*Attorney, Agent, or Firm*—Rene' E. Grossman; Melvin Sharp

[57] ABSTRACT

Diclosed is a dual band communication receiver for use in a burst communication sytem. The receiver is capable of esentially simultaneous reception at a first carrier frequency (L), such as L-band and a higher carrier frequency (H), such as S-band, using distinct codes and replying in the frequency band received. A typical system is composed of a transponder and an interrogator. The incoming coded signal is down coaverted to an i.f. frequency compatible with surface acoustic wave (SAW) convolvers. The i.f. signal is then divided between two SAW convolvers, each having a convolution interval of two times the message symbol length (2T). Reference signals A and B are composite signals comprised of alternate L-band and H-band signals, each having a time period equal to T and each L- or H-band signal operating at a 50% duty cycle. Reference signals A and B are time reversed to the input signals applied to the convolver and are orthogonal to one another. Each of the convolver outputs are processed through log video detection circuits to reduce the dynamic range followed by peak detecting and stretching to reduce the pulse bandwidth. The outputs from each peak detection and stretching circuitry are coupled to a sample-and-hold circuit which are in turn divided such that one path is to synchronization and interrogation sidelobe suppression (also referred to as sidelobe inhibit, ISLI or control signal) matched filters designed to look for the particular symbol sequences between the two convolver channels characteristic of the preamble and ISLI signals. The synchronization signal and the sidelobe suppression signal are used in order to determine if a valid preamble has been detected by the receiver and if the receiver is in a desired portion of the interrogator radiation pattern; if so, then a timing or address signal and the remaining portion of the message which contains the data is clocked into a memory.

28 Claims, 9 Drawing Sheets 4,910,521

DUAL BAND COMMUNICATION RECEIVER

The Government has rights in this invention pursuant to Contract No. F33615-80-C-0140 awarded by the Department of the Air Force.

This invention relates to burst communication receivers and more particularly to communication receivers which operate asynchronously on a plurality of messages which are received nearly simultaneously from multiple transmitters which are transmitting two distinct carrier frequencies using distinct codes.

Receivers used in burst communications systems where it is necessary to exchange data between communicators (such as an interrogator and a transponder) may be subjected to interference from enemy spoofing, jamming, exploitation and deception. Receivers which have been used in the past for IFF purposes encounter difficulties when attempting to decipher multiple, overlapping messages from an interrogator or transponder. Additionally, an enemy might attempt to generate some or all possible interrogation signals (or transponder replies) to deceive or exploit a friendly IFF system. Prior art IFF systems were easy to jam and required that the transmitter power be very large compared to the jamming signals applied to the receiver. Receivers operating in an IFF system (either in a transponder or an interrogator) must be able to operate asynchronously on relatively short messages, that is, detect the message content as it arrives without the benefit of knowing when it is going to arrive.

Therefore it is an object of the present invention to provide a receiver which may operate asynchronously on relatively short messages received at two distinct carrier frequencies using distinct codes.

Another objects of the present invention is to provide a receiver which is able to receive data substantially simultaneously from multiple communicators operating at two different carrier frequencies such that all messages are received.

Another object of the present invention is to provide a receiver system which limits the communication sequence to only the communicators (interrogators and transponders) of interest, thereby reducing the degradation of the system through mutual interference.

Another object of the invention is to provide a receiver capable of operating in hostile (enemy) environments where large numbers of communicators are active.

Another object of the present invention is to provide a receiver system which incorporates a unique means for determining a valid message (interrogation or reply) thereby preventing deception and exploitation of the system.

Another object of the present invention is to provide a receiver system which allows messages to be of less power than a jamming signal yet still detect such valid messages.

Another object of the present invention is to detect valid interrogation and reply messages even when the jamming power levels are equal to or higher than the power levels of the interrogation and reply messages.

Another object of the present invention is to provide an IFF system which has improved beam sharpening capability to reduce the number of overlapping replies to an interrogator.

A still further object of the present invention is to provide a receiver system which is reduced in cost and increased in terms of reliability.

Another object of the present invention is to provide a dual band IFF system which includes a receiver capable of detecting messages at two different carrier frequencies with minimal increase in hardware and cost.

Other objects and features of the invention will become more readily understood from the following detailed description and appended claims when read in conjunction with the accompanying drawings, in which like reference numerals designate like parts throughout the figures thereof, and in which:

Figure 1:
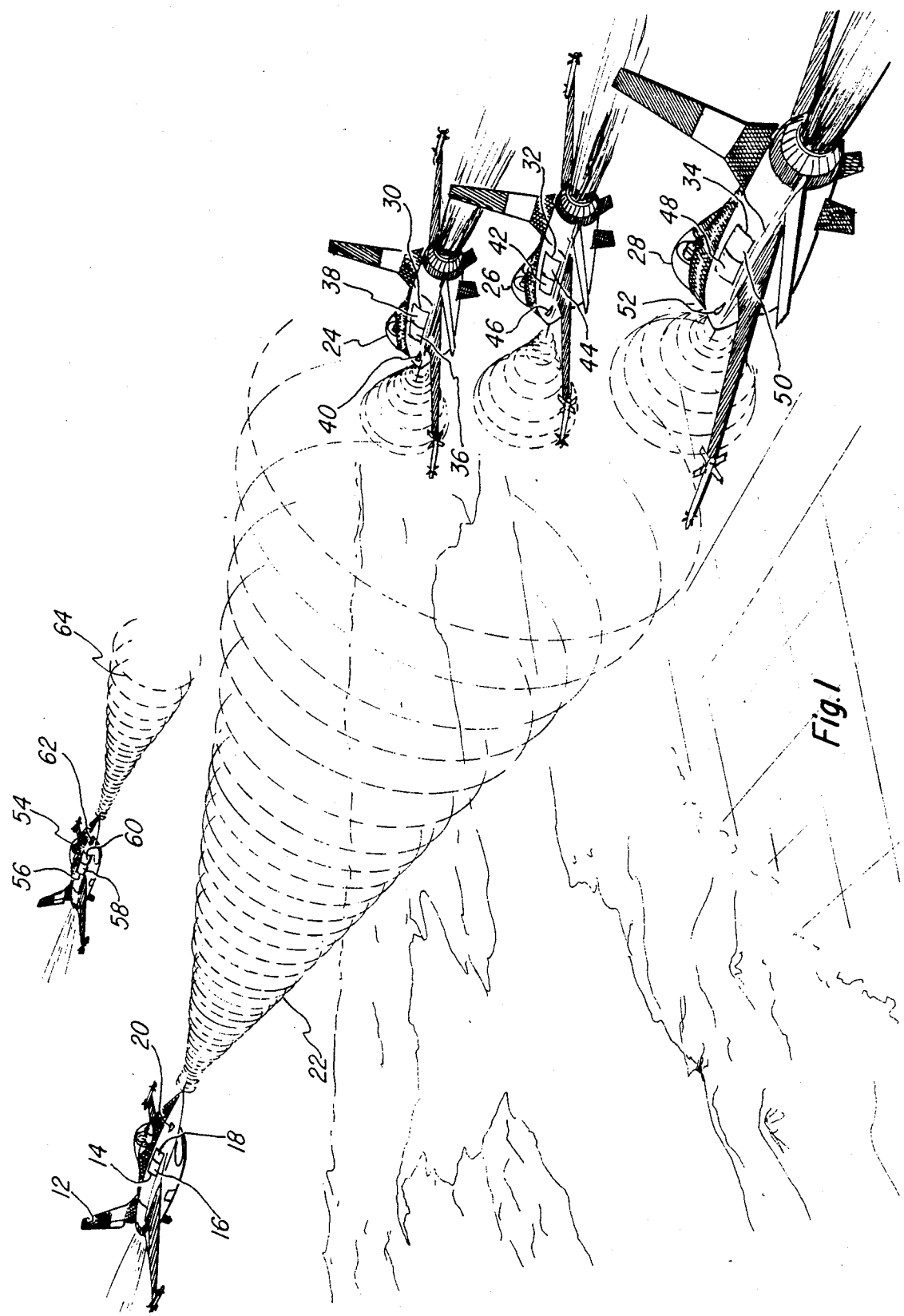
FIG. 1 is an identification-friend-or-foe system in which the receiver according to the present invention can be used.

Referring now to FIG. 1, there is illustrated an identification-friend-or-foe (IFF) system 10 which incorporates the receiver according to the present invention. An airplane 12 includes an interrogator 14; the interrogator 14 includes both a transmitter 16, a receiver 18 and a common antenna 20. The pilot in airplane 12 can actuate interrogator 14 to transmit a multibit coded message signal 22 to other aircraft 24, 26 and 28 within a predetermined location within the antenna pattern of aircraft 12. Airplanes 24, 26 and 28 each have transponders 30, 32 and 34 included therein. Transponder 30 includes a transmitter 36, a receiver 38 and an antenna 40 while transponder 32 also includes a transmitter 42, receiver 44, and antenna 46 and transponder 34 includes transmitter 48, receiver 50 and antenna 52. Assuming that each of the transponders 30–34 are located within the antenna pattern of antenna 20 in aircraft 12, then transponders 30–34 must detect and decode in receivers 38, 44 and 50 respectively, the signal 22 and reply with a coded message from transmitters 36, 42 and 48 that the interrogator receiver 18 must detect and decode. It is common to have multiple aircrafts, such as additional aircraft 54 in the area, said aircraft having on board an interrogator 56 including a transmitter 58, receiver 60 and antenna 62. This interrogator 56 may also be activated to transmit a coded message 64 which may also be detected by transponders 30–34. Receivers 38, 44 and 50 are operating in evironments where messages will be arriving from several other system users (such as interrogators 16 and 56) nearly simultaneously. In addition, none of the receivers will know accurately when messages will arrive although each will know the coding sequences to be expected. Also, when used in an IFF system 10, hostile forces or the enemy will attempt to jam system 10 by repeating all or part of the coded message in an attempt to make the transponders 30–34 reply to those false messages and thereby not be able to reply to a valid message received during this time interval.

Although the receiver according to the present invention will be described with respect to an IFF airborne system 10, it will be recognized by those skilled in the art that other applications as well as ground based systems may incorporate the receiver to be described hereinbelow. The receiver to be described herein can be used both in the interrogator as well as the transponder portion of the system.

In other words, the receiver according to the present invention is used in a burst communication system where it is necessary to exchange data between communicators (the interrogators and transponders) where speed and security from enemy spoofing, jamming and exploitation are primary concerns. The probability of jamming suggests that spread spectrum techniques be used to achieve signal versus jamming improvements with respect to data detection and synchronization. The spread spectrum technique employed is modulation of a CW carrier. As mentioned earlier, it is necessary that both the interrogator and transponder generating the waveform know the proper modulation sequence or code so that the signal versus jamming improvements can be obtained in the receiver. To prevent an enemy from exploiting the IFF system by also knowing the proper code from past observations, the code is selectively changed at short intervals (known as code, validity intervals).

In IFF system 10 illustrated in FIG. 1, because of the large number of communicators utilizing such system, the transponders and interrogators must be able to communicate rapidly which impacts the receivers included therein in the following manner. Firstly, the receivers, such as receiver 18 and 38, must be able to operate asynchronously on relatively short messages, that is, the receivers must be capable of detecting the symbols (or codes) as they arrive without the benefit of knowing when they are going to arrive or the benefit of long code search times. This type of requirement exists when the sender is interested in communicating with many receivers in very short time periods. Secondly, the receivers must be able to receive data almost simultaneously from multiple senders so that all messages are detected. Thirdly, the communication sequence must be limited to only the senders and receivers of interest to each party since without this limitation, senders will receive return communications from many receivers which will block the reception of all messages through mutual interference.

Figure 2:
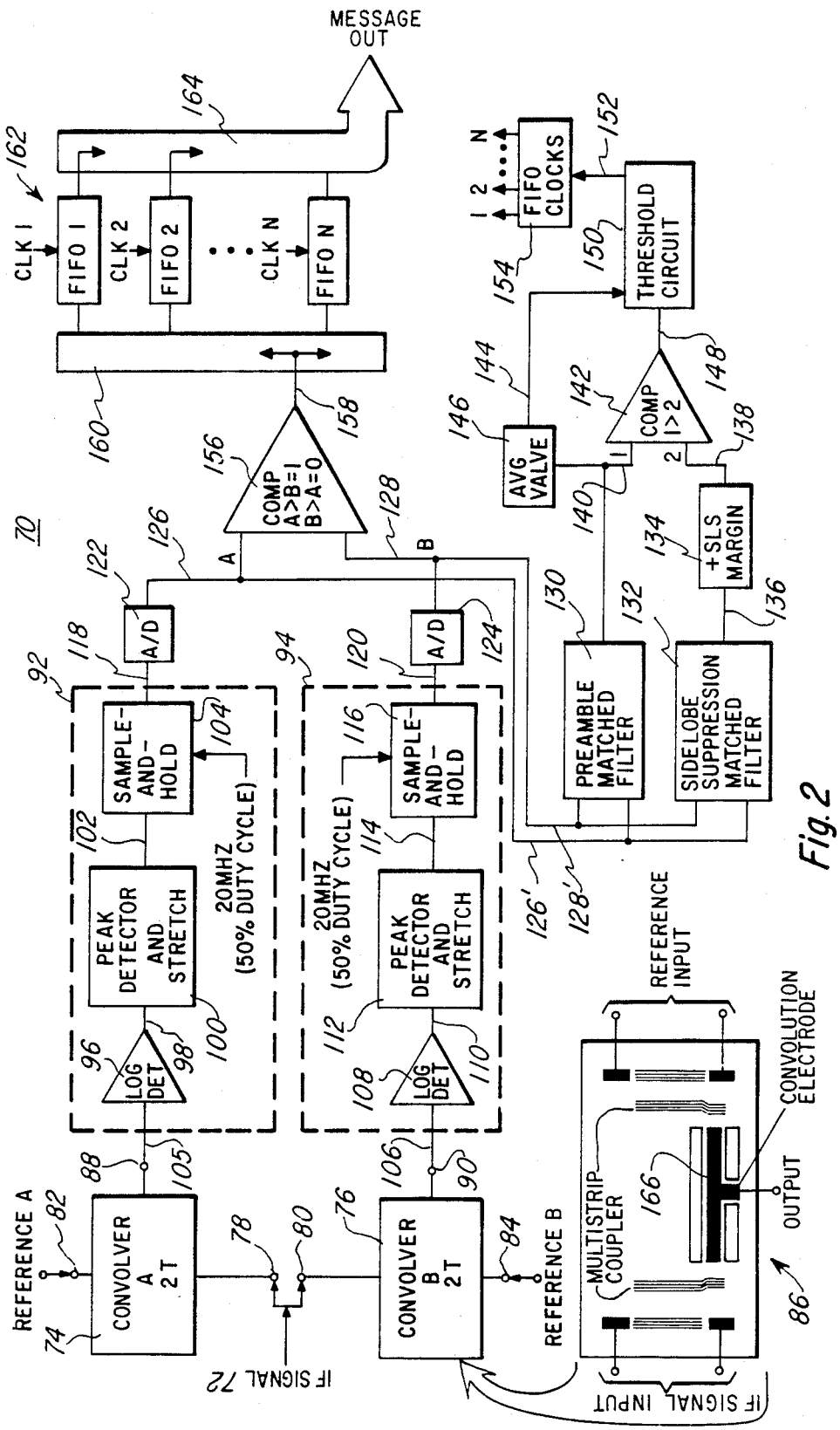
FIG. 2 is a block diagram of a communication receiver according to the present invention.

FIG. 2 illustrates a receiver 70 according to the present invention. For purposes of discussion, it will be assumed that this receiver is designed for the transponder in IFF system 10. The transponder antenna and r.f. to i.f. down conversion circuitry is not shown in FIG. 2. A multibit coded message i.f. signal 72 is input to receiver system 70. A first convolver 74 and a second convolver 76 have each of their input ports 78 and 80 respectively connected to receive such i.f. signal 72. The reference port 82 of convolver 74 is connected to receive a reference A signal while reference port 84 is connected to receive reference B signal. The general configuration of the convolver is shown in the insert 86. The output port 88 of convolver 74 and the output port 90 of convolver 76 are connected to video processing circuitry means 92 and 94, respectively. Video processing circuitry means converts the i.f. correlated input signal from output ports 88 and 90 to a video correlated signal. Video processing circuit means 92 may be comprised of a log detector 96 coupled by conductor 98 to peak detector and stretch circuit 100. The output of such peak detector and stretch circuit 100 is coupled by way of conductor 102 to sample-and-hold circuit 104.

In similar manner, the output present on output port 90 is a full correlated, i.f. bit amplitude signal which is coupled by way of conductor 106 as an input to log detector 108. The output of log detector 108 is, in turn, coupled by conductor 110 to peak detector and stretch circuit 112. The output of peak detector and stretch circuit 112 is coupled by way of conductor 114 to sample-and-hold circuit 116. The outputs from sample-and-hold circuits 104 and 116 are coupled by way of conductors 118 and 120 to analog/digital converters 122 and 124, respectively.

It will be recognized by those skilled in the art that more than 2 convolvers can be used according to the present invention (e.g., 4, 8, etc.) without departing from the spirit and scope of the invention. With such an increase of convolvers, for example 4, the symbol length T would convey 2 data bits of information; with 8 convolvers, 1 symbol would convey 3 data bits of information, etc. The advantage of increasing the number of convolvers used is to decrease the time necessary to transmit the information (with however, the attendant disadvantage of increased hardware). For purposes of the discussion herein, it is assumed that 2 convolvers are used so that symbol and bit are used interchangably.

The outputs 126 and 128 from A/D converters 122 and 124 are divided such that one path, namely conductors 126' and 128' are connected to synchronization or preamble detection circuitry 130 and sidelobe suppression circuitry 132. If the message includes time stagger information (rather than preamble information), then the synchronization circuit 130 may be a shift register which is one message length long with taps coming off the register going to a m/n detector where n is less than or equal to the number of bits in the message and m is a threshold level less than n. The output from the m/n detector inputs memory means 162 (to be described later). It will be assumed herein that the incoming message includes preamble information for purposes of describing the system operation. "Preamble" information as used herein means synchronization information that either precedes or follows the data information. Preamble detection circuitry 130 and sidelobe suppression circuitry 132 are, in the preferred embodiment, matched filters that are designed to detect particular symbol sequences in the receiver A and B channels. One such sequence is the preamble signal that preceeds the message data and establishes message time of arrival for the receiver 70. The other sequence is the sidelobe suppression or control signal that is transmitted substantially simultaneously with the preamble signal. The relative magnitude between the preamble detection circuitry output and the sidelobe suppression circuitry output is a measure of whether the message was received by the transponder receiver 70 in the main beam of an interrogator (such as interrogator 14 in FIG. 1) or in the sidelobe pattern. A voltage from the SLS margin circuit 134 is added to the output of the sidelobe suppression circuit 132 which is compared via conductor 138 to the preamble output on conductor 140. This comparison takes place in digital comparator 142. If the preamble output on conductor 140 is larger than the output on conductor 138, then receiver 70 will continue to process the message. The voltage added to the output of sidelobe suppression circuit 132 on conductor 136 in SLS margin circuit 134 can be varied to sharpen or broaden the response of receiver 70. If the preamble signal on conductor 140 is larger than the sidelobe suppression signal (on conductor 138), then the preamble signal is compared to the average signal output on conductor 144 generated in average value circuit 146. If the preamble output on conductor 148 is larger than the average output of the preamble generated on conductor 144 by a certain voltage magnitude, namely the magnitude of voltage generated in threshold circuit 150, then receiver 70 has detected a valid preamble within the desired response region and a timing or FIFO clock circuit 154 initiates a clock or timing signal. This procedure is repeated for each incoming preamble and if a valid preamble is detected, the first in first out (FIFO) clock circuit 154 will actuate different timing signals. If N timing signals are required, then clock generator 154 may generate N different timing signals having N different phases.

The other path from channel A and channel B on conductors 126 and 128 are coupled to the input of a digital comparator 156 which generates an output designated binary "1" when the channel A signal from A/D converter 122 exceeds the magnitude of the signal from channel B A/D converter 124 on conductor 128. When the channel B signal from A/D converter 124 exceeds the magnitude of the signal from channel A A/D converter 122, the digital comparator 156 generates an output designated as binary "0". The output 158 from comparator 156 is connected to a data bus 160 which sequentially stores the data from line 158 in data bus 160. When the receiver 70 detects a valid preamble and initiates a clock signal 1 from FIFO clock circuit 154, this clock signal 1 will enable a storage means 162 comprised of a plurality of shift registers connected in parallel to data bus 160. The FIFO clock output timing signals 1, 2 ... N are connected as clock inputs to the plurality of shift registers FIFO 1, FIFO 2 ... FIFO N, respectively, in storage means 162. As mentioned previously, when the receiver has detected a valid preamble and a clock is started, this enables the remaining data portion of the coded signal to be clocked into one of the parallel bank of shift registers labeled FIFO 1, ... FIFO N. As subsequent preambles are detected, different clock signals from FIFO clock circuit 154 are actuated thereby allowing the remaining portion of the data signal to be stored in one of the parallel shift registers FIFO for later processing.

As mentioned earlier, the interrogator receiver is identical to the transponder receiver 70 (with the exception that the SLS circuitry 132 and 134 as well as comparator 142 are not required). The data messages stored in storage means 162 in the parallel storage registers may be read out as desired on data bus 164.

Figure 3:
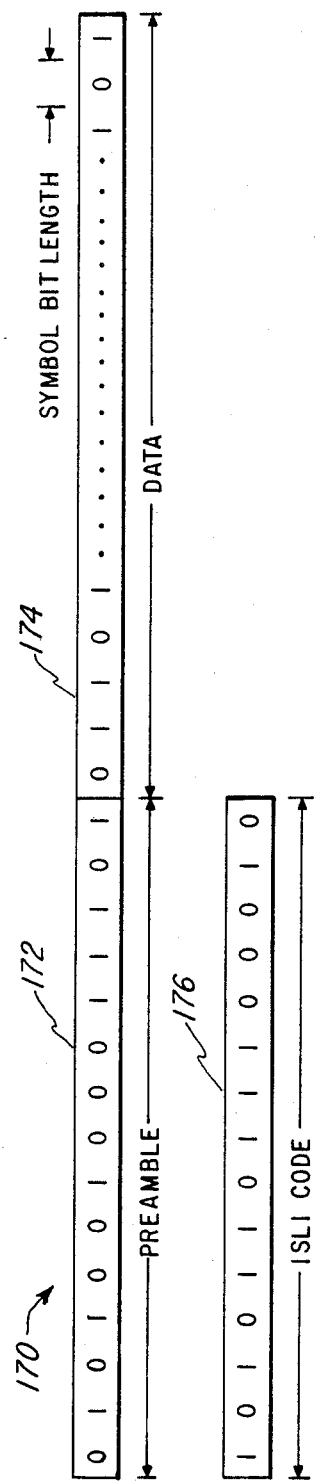
FIG. 3 is an illustration of a typical transmitted interrogator word or message and a control signal.

FIG. 3 illustrates a typical message 170 transmitted by an interrogator 14 (FIG. 1) and includes a preamble section 172 and a data section 174. The preamble section is comprised of a predetermined number of bits (15 being used for illustration). Receiver 70 in FIG. 2 must detect the unique distribution of ones and zeros in the preamble in order to verify that the remaining portion of the data 174 is to be processed. A control signal 176 (identified in FIG. 3 as the ISLI Interrogator Side Lobe Inhibit) is transmitted substantially simultaneously with the preamble; the control signal 176 is transmitted, however, on the delta pattern of the interrogator antenna. It will be noted from FIG. 3 that the control signal code 176 is orthogonal to the preamble code 172.

In the preferred embodiment, the r.f. message received by the receiver 70 (FIG. 2) is down-converted to an i.f. frequency compatible with convolvers 74 and 76. In the preferred embodiment, convolvers 74 and 76 are surface acoustic wave (SAW) convolvers. SAW convolvers 74 and 76 perform the programmed matched filter function to despread the coded waveforms (the data representation of which is illustrated in FIG. 3). A matched filter has an impulse response equal to the time inverse of the impulse response of the desired received signal and thus has the characteristic of providing the maximum achievable signal-to-noise improvement on the received signal. In hostile environments, such as IFF system 10, the noise level will actually be generated by a jamming signal from an enemy, so signal-to-jammer improvement is obtained. Programmability is achieved by changing the impulse response of the filter. In a SAW convolver, the impulse response is the reference signals (namely reference signal A on reference port 82 (FIG. 2) and reference signal B on reference port 84 of convolver 76) which can be changed by electronically generating different waveforms. Thus, the SAW convolvers 74 and 76 can be used in spread spectrum systems to achieve signal-to-noise jammer improvement and be programmable to prevent spoofing and exploitation.

SAW convolvers 74 and 76 also provide time compression of the received signal energy. The sender tries to maximize the energy content of the transmitted data symbol to maximize the probability that the receiver can detect the symbol. Since the energy is equal to the peak power multiplied by the symbol length in time (for uniform amplitude signals), there are two choices: increase the power or increase the time length. In practical systems, power is constrained below some upper limit so typically symbol lengths are increased to achieve the desired energy content. However, as symbol lengths are increased, the ability of a receiver to detect all messages in a dense environment decreases due to mutual interference. It is a property of convolvers 74 and 76 acting as matched filters to compress the symbol energy into a pulse equal in width approximately to the inverse of the symbol bandwidth. For example, if the bandwidth were 100 MHz, the compressed pulse would occupy only about 10 ns of time regardless of the original transmitted length of the pulse. In this case, a second symbol could arrive at the input of receiver 70 from a second sender or interrogator only 10 ns ahead or behind the first symbol and still be detected by receiver 70. This greatly increases the data handling capability of receiver 70, thus allowing it to detect all messages as they are received.

The process used to adjust the bandwidth of the symbol is the spread spectrum technique. A pulse of CW carrier 10 $\mu$sec long has a bandwidth equal to about 1/10 $\mu$sec or 0.1 MHz. However, if the phase of the carrier is altered (say every 10 ns), then the bandwidth of the symbol will be 1/10 ns or 100 MHz. There would be a thousand such phase changes in the total symbol length. The sequence of these phase changes is the code that must be duplicated, time inverted and input to the convolvers 74 and 76 as the reference waveforms (reference A and reference B) to provide the matched filter function.

A SAW convolver uses the non-linearities in the elastic constants for propagation of surface waves in a substrate (such as a LiNBO$_3$ substrate) to form the convolution of the input signal with a reference signal. The general configuration of a SAW convolver is shown in insert 86 in FIG. 2. The efficiency of the non-linear interaction is proportional to the power density in the device. Therefore, acoustic signals, representing the input signal and reference waveforms, generated by interdigital transducers are compressed into a narrow band in the interaction region of the device. The compressed acoustic beams are directed into a thin film metallic waveguide 166 which confines the acoustic energy and serves as the integrating electrode for the convolver output. A more detailed description of a convolver suitable for the present application is entitled "Wideband Elastic Convolvers" by H. Gautier and C. Maerfeld, 1980 IEEE Ultrasonics Symposium, pages 30–36, 0090-5607/80/0000-0030.

The binary orthogonal key data demodulation is accomplished using two convolvers 74 and 76. The use of these convolvers provides one additional function, namely, the asynchronous correlation of the received symbol. In other words, regardless of when the input signal (symbol) arrives at receiver 70, convolvers 74 and 76 acting as matched filters will provide maximum signal-to-jammer improvement. There is no lengthy code search time required to synchronize to the incoming signal.

Figure 4:
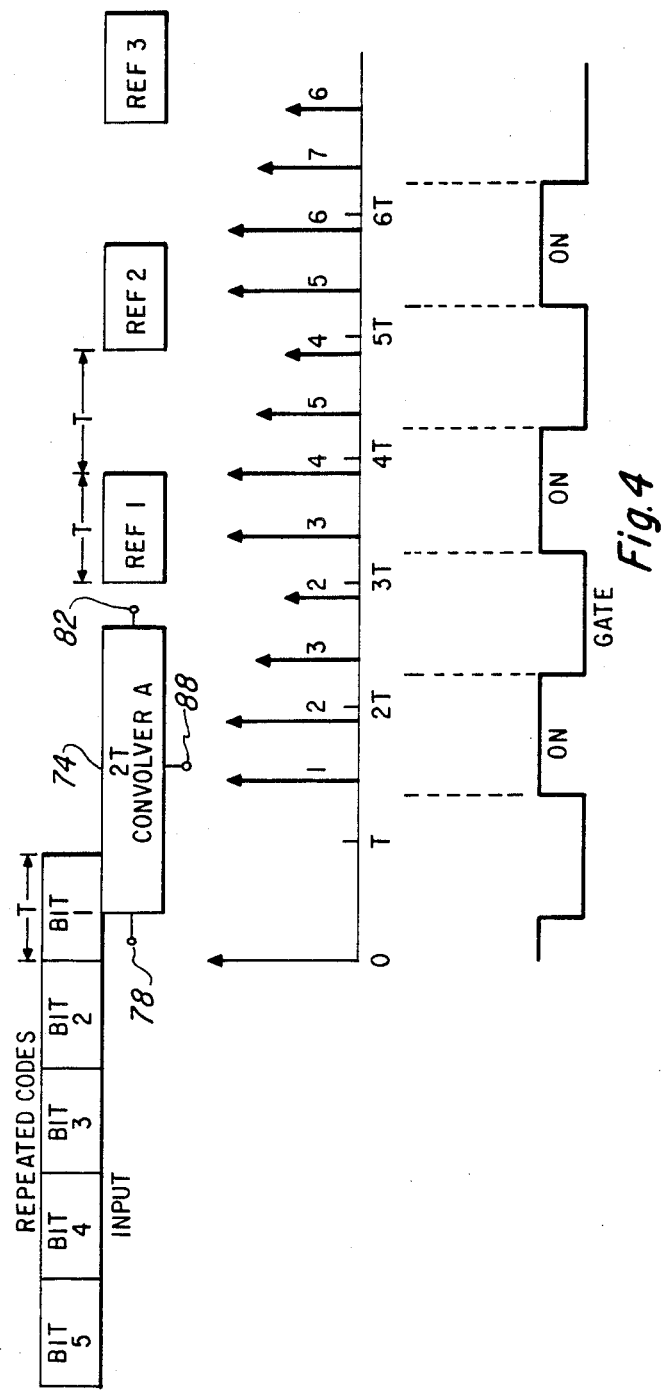
FIG. 4 is the timing sequence illustrating the theory of operation of a 2T convolver.

FIG. 4 illustrates the operation of convolver 74 to achieve synchronization and correlation of the incoming signal. An input signal consisting of, for example, five data bits (symbol) is input to the input port 78 of convolver 74 from the left and can be pictured as moving to the right as time progresses. At the instant in time illustrated in FIG. 4, bit 1 is approximately half way into convolver 74. Each bit is T units long and consists of the same code-sequence. The reference waveforms are also T units long and generated from the same code sequence (but actually time reversed) enter the convolver 74 on reference port 82 from the right and travel to the left as time progresses. As is illustrated in FIG. 4, it can be seen that each reference symbol is spaced T units behind the end of the previous symbol, i.e., the reference signal A has a 50% duty signal. The time line shown under convolver 74 illustrates the convolver output as time progresses where zero is the time depicted in FIG. 4. The numbered vertical arrows represent the compressed pulses which occur when a reference symbol and data bit overlap exactly while in convolver 74. It can be seen that in a period of time greater than T but less than 2 T the first reference symbol and the first data bit will correlate while both are completely within the convolver. This correlation pulse is labeled 1. One-half T units later, the first reference and bit 2 will correlate while both are completely within the convolver. Hence, arrow 2 is at the same height as arrow 1. As the first reference is partially out of the convolver (moving from right to left), it will align with part of bit 3 that is entering the convolver from the left, yielding a partial correlation illustrated by the shorter arrow 3. A similar series of correlation pulses is produced as the second reference travels through convolver 74. It should be noted that on the time line each data bit has one and only one full correlation. These represent the compressed pulses that will be detected by the remainder of receiver 70. It should also be noted that full correlations only occur when a reference symbol is completely within convolver 74. Partial correlations which represent spurious, unwanted signals occur when a reference is partially in convolver 74. It is this timing relationship between the position of the reference and the desired output pulses that allows receiver 70 to sort out the full correlations from the partial correlations. In essence, receiver 70 only looks at the output when a reference symbol is completely within the convolver. The length of 2T for convolver 74 and a 50% duty cycle for the reference signal is the only combination which will produce one and only one full correlation on a data bit that arrives at any time. Accordingly, convolvers 74 and 76 perform the functions or are used to achieve receiver signal-to-jammer improvement, programmability, time compression of the received signal to decrease interference effects and asynchronouss correlation to insure rapid detection of received messages. Typical values for T would be 10 μsec such that the convolver would have a convolution interval of 2T or 20 μsec.

As mentioned previously, the two convolvers 74 and 76 in FIG. 2 utilize binary orthogonal keying (BOK) data modulation. That is, a data bit "1" is communicated by transmitting a code which is correlated in upper convolver 74 and a data bit "0" is correlated in lower convolver 76. Data is determined by comparing the two convolver outputs to determine the larger. This comparison takes place in digital comparator 156 (FIG. 2). Typically, these data bits are on the order of 10 ns which make it extremely difficult to compare the magnitude of the two pulses. In order to enable comparison of the magnitudes of the output signals from correlators 74 and 76, each of said output signals is transmitted through video processing circuits 92 and 94 which are identical and comprise, in channel A, a log detector 96, a peak detector and stretch circuit 100 and a sample-and-hold circuit 104. The log detector 96 removes the i.f. carrier and reduces the dynamic range of the signal while the peak detecting and stretch circuit 100 and sample-and-hold circuit 104 reduce the pulse bandwidth of the signal in order to make it compatible with state-of-the-art A/D converters, such as A/D converter 122.

Figure 5:
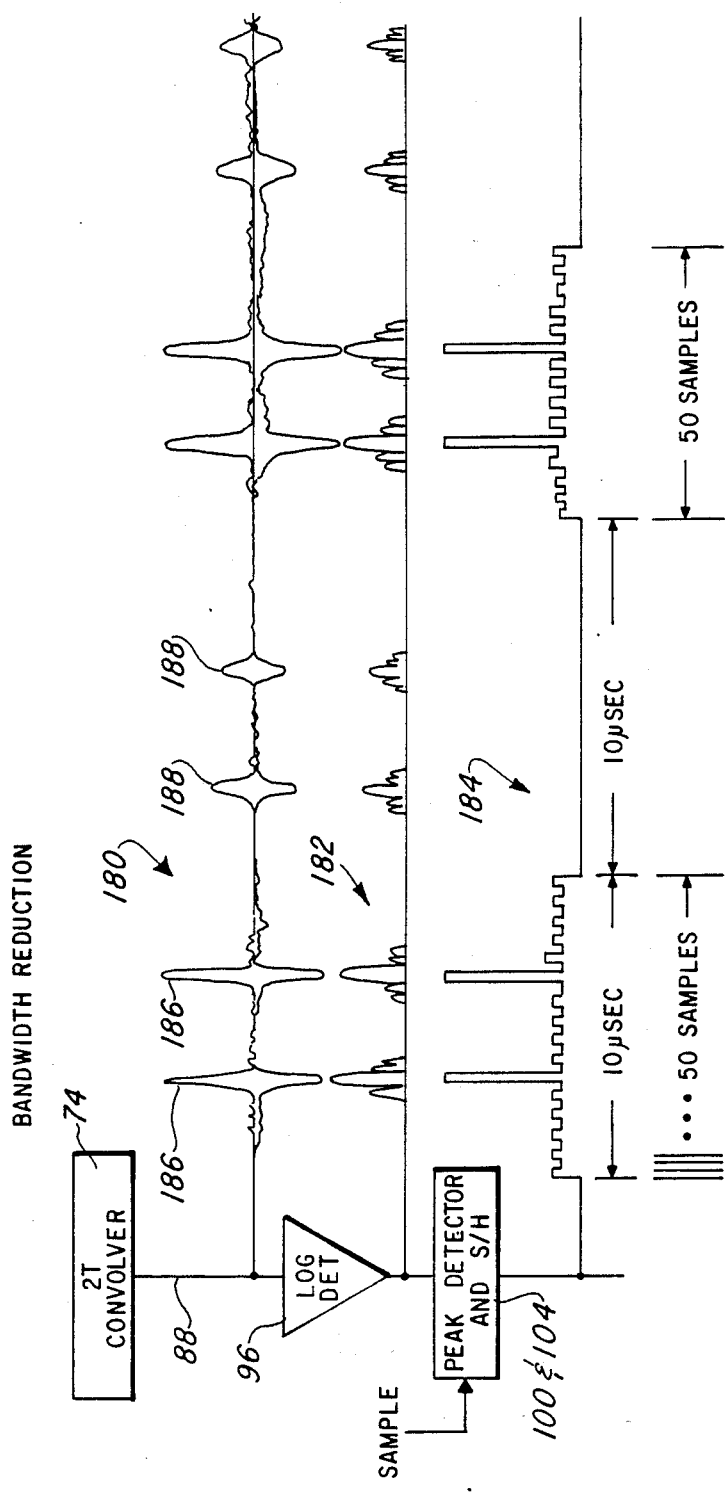
FIG. 5 illustrates waveforms at various points in the receiver system of FIG. 2.

FIG. 5 illustrates the bandwidth reduction accomplished through the use of the log detector 96, the peak detector 100 and sample-and-hold circuit 104. Waveforms 180, 182 and 184 are illustrative of the output from the convolver 74, the log detector 96 and the sample-and-hold circuit 104, respectively. For purposes of illustration, we have assumed a bit rate of 10 μsec and a sampling rate of 20 MHz at a 50% duty cycle. Waveform 180 illustrates an i.f. correlated signal having both full correlation peaks 186 and partial correlation peaks 188. A 50% duty cycle is used since it has been shown that full correlations occur at a 50% duty cycle (see FIG. 4). Waveform 182 illustrates the conversion of the i.f. signal 180 to a video signal 182 having a reduced dynamic range. Waveform 184 illustrates the output from sample-and-hold circuit 104 and with a 20 MHz sampling rate, 50 samples of the convolver output are achieved every 10 μsec. Not shown for reasons of clarity is the action of the peak detector circuit 100. As mentioned previously the width of the pulses 186 in signal 180 is approximately 10 ns in the example. After log detection in circuit 96 the pulses are still very short. The peak detector 100 determines the maximum voltage of the pulses and maintains the value until the value is sampled by the sample-and-hold circuit 104. This action, in essense, stretches the pulses to 50 ns (1/20

MHz). Accordingly, it is now possible, after going through A/D converters 122 and 124 to readily compare the magnitude of the signals in digital comparator 156.

Knowing when to look for data (called message synchronization) in a burst communication system is solved in one of two ways. Either a preamble is included at the beginning of a message to cue the receiver to receipt of data at a later time or the data is staggered in time about uniform time spacing in such a manner that the detection of data bits in that stagger pattern is the clue that a message has been received. Either technique is approximately equivalent. If the need did not exist to be able to limit the number of communication links to only partners of interest in IFF system 10, then either method of message synchronization would be acceptable. However, in an IFF system where it is necessary to communicate rapidly with partners in an environment where there are a large number of communicators and without limiting the number of communication links, interference effects would prevent the receipt of desired signals, thus delaying or preventing data transfer.

Under this condition, message synchronization is best accomplished with the use of a preamble. The receiver according to the present invention is capable of limiting the number of communication links through beam sharpening. To understand, it is necessary to review how a message is transmitted through space. The interrogator 14 (FIG. 1) who initiates the communication action transmits a preamble to the message over an antenna pattern known as a sum pattern and similarly transmits a control signal over a difference pattern.

Figure 6:
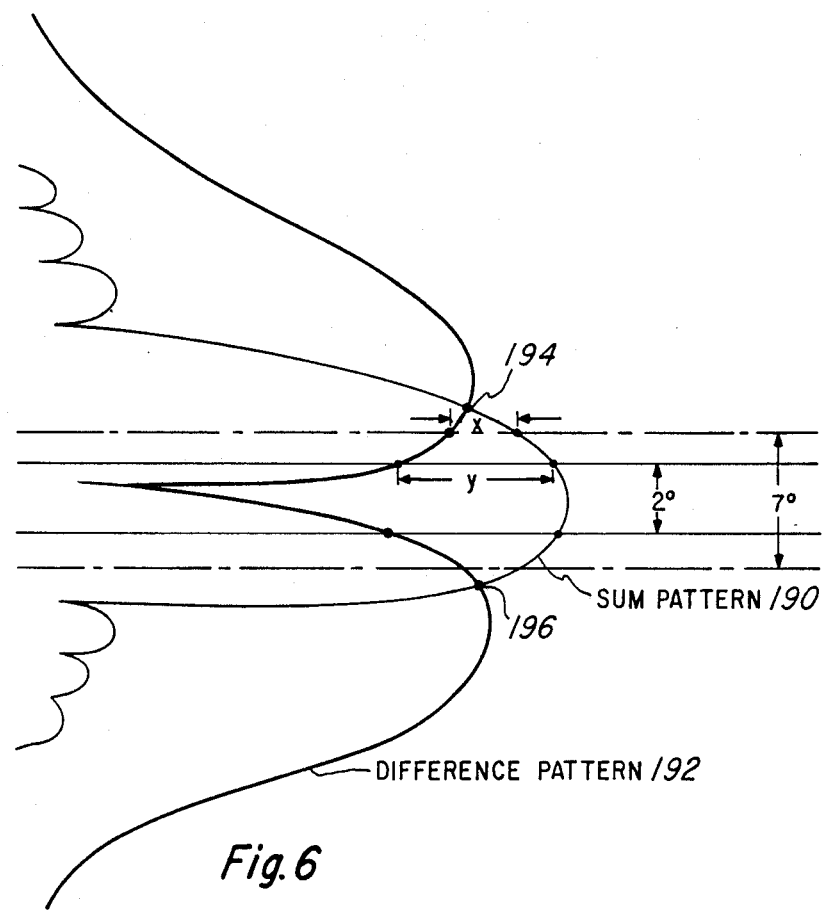
FIG. 6 illustrates the sum and difference pattern of a typical transmitter antenna.

FIG. 6 illustrates a typical sum pattern 190 and difference pattern 192. In an IFF system where there are a large number of transponders, there may be many transponders that can detect the preamble transmitted in the sum pattern 190 (also known as the main beam). Since these transponder receivers would typically process the received message and reply approximately in unison, a large interference problem would exist at the receiver of the interrogator. In order to prevent this, it is desired to limit the transponder receivers (such as receiver 44 in aircraft 26 in FIG. 1) that reply to only those in the center portion of the sum pattern 190. This is called beam sharpening. Observing the delta pattern in FIG. 6, it will be noted that everywhere inside a portion of the main beam (namely between points 194 and 196), the difference pattern amplitude is less than the sum pattern amplitude and everywhere outside the points 194 and 196, the difference pattern amplitude is greater than the sum pattern amplitude. Beam sharpening is accomplished by comparing the amplitude of the received (sum pattern) signal to that of the control signal received on the difference pattern and replying only if the amplitude difference between the two exceeds some predetermined level. Stated another way and referring again to FIG. 6, if the sum pattern exceeds the difference pattern by an amplitude of x, the antenna beamwidth is 7 degrees. If the sum pattern exceeds the difference pattern by a greater amplitude y, then the antenna beamwidth is further reduced to 2 degrees.

In typical implementations of beam sharpening, a single pulse is transmitted on the main beam followed at some interval by a single pulse transmitted on the difference beam. The receiver detects the pulses and compares the amplitudes. This approach fails in environments where jamming is present because the jamming energy can cover the lower level control signal, thereby preventing an accurate comparison and thus preventing a reply. This can occur even when the jammer is not strong enough to prevent receipt of the message. This fault is often corrected by transmitting greater power on the control signal, but this requires more expensive transmitters and, in effect, reduces maximum range. This beam sharpening technique can also fail when a multipath is present such that the main beam can arrive twice, once coincident with the control signal after taking a longer path to the receiver. A third common failure mode is when an interferring signal arrives coincident with the control signal, a situation likely in dense environments.

In the system according to the present invention an interrogator transmitter transmits a preamble consisting of multiple symbols alternating in a known pattern between the "1" and "0" codes on the main beam and simultaneously transmitting the orthogonal code on the difference pattern, i.e., if a "1" is transmitted on the main beam, a "0" is transmitted on the difference pattern. These symbols are detected and correlated in filters matched to the respective "1" and "0" code patterns. In receiver 70 of FIG. 2, the preamble matched filter 130 detects and correlates the preamable on the sum pattern while the sidelobe suppression matched filter 132 detects and correlates the orthogonal control (ISLI) code on the difference pattern. Amplitude information is preserved during both correlation processes.

Referring again to FIGS. 2 and 6, the output of the preamble match filter 130 on conductor 140 is compared to the output of the sidelobe suppression match filter 132 on conductor 136 and if the amplitude of the preamble exceeds that of the sidelobe suppression by a predetermined amount which is inserted by SLS margin circuit 134 (for example an amplitude y in FIG. 6), then receiver 70 is assured that it is within the main beam (the 2 degree beamwidth) of the interrogator transmitter antenna. The comparator 142 will generate a signal which actuates clock circuitry 154 causing the data information following the preamble to be inserted in storage FIFO registers 162.

The advantage of this process is that additional signal-to-jammer improvement is obtained by matched filtering the preamble and control signals so that accurate amplitude comparisons can be made up to the point where enemy jammer energy destroys the ability to detect the message. In other words, if receiver 70 can detect the message, then it can also perform the beam sharpening process. This is accomplished without increasing the power on the control (ISLI) signal.

This technique also virtually eliminates the multipath problem because the signals are transmitted simultaneously and so multipath would appear as a second set of later signals which would not interfer with the reception of the true signals. The problem of an inteferring signal arriving simultaneously with the preamble and control signals is greatly reduced because of the large number of symbols in this signal. A single random interference or even several would not degrade the processing gain significantly.

With time stagger synchronization, additional symbols are added to the message and transmitted over the sum and difference antenna patterns similarly to the preamble and ISLI signals except these additional symbols are not used for synchronization functions. To achieve the same degree of beam sharpening available in the preferred embodiment disclosed herein, it would be necessary to determine amplitude information of the additional symbols. To do this would require determining amplitude information of all symbols since synchronization and therefore position of the added symbols is not known until the entire message has been received and stored in memory. In the time stagger receiver, amplitude information is typically not determined. The added cost and complexity to determine and store all of the required amplitude information is the reason that beam sharpening is best accomplished with a preamble. A receiver concept can be designed where the added symbols are added to the end of the message where they could be located after message synchronization and then processed as described herein to achieve beam sharpening to the same degree. In other words, the receiver according to the present invention will achieve synchronization regardless of the form of synchronization signals, either time stagger or preamble information.

The simultaneous transmission of the preamble and control (ISLI) signal is done primarily to prevent an enemy from exploiting the system by separating the preamble and control signal. Typically this requires the use of a second transmitter, one for the main beam and one for the control signal. With the beam sharpening technique incorporated in receiver 70, it is possible to adjust the number of preamble symbols so as to have one transmitter and divide the power during the preamble portion of the message and then regain the signal-to-jammer improvement by matched filtering the preamble and control signals.

The receipt of the preamble cues receiver 70 to look for data arriving at known time intervals following the preamble. For example, every ten microseconds the output of convolvers 74 and 76 can be compared to determine if a "1" or a "0" has been transmitted. These decisions can be stored in a memory for processing when the total message has arrived.

Receiver 70 can process many messages which arrive almost simultaneously. The arriving pulses after compression can be approximately 10 ns wide. These pulses are stretched to typically 50 ns and then decisions are made every 50 ns. Therefore, messages that arrive offset from each other by only 50 ns can be processed totally independently, almost as though the other message did not exist. As mentioned previously in discussion of FIG. 4, data symbols entering the receiver 70 10 μsec apart leave the convolver 74 5 μsec apart. Therefore data from the same message will occupy two of the 50 ns samples taken during the 10 μsec interval. Since there are two hundred 50 ns intervals in a 10 μsec interval, the receiver system 70 could conceivably handle 100 overlapping messages (this would mean that storage means 162 in FIG. 70 would require 100 FIFO registers, namely n=100 and clock circuit 154 would be required to generate 100 timing signals).

Figure 7:
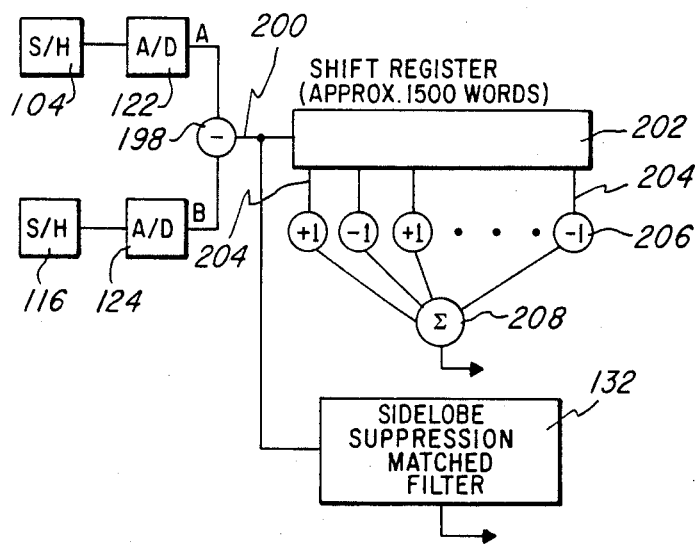
FIG. 7 illustrates a more detailed block diagram of the preamble matched filter illustrated in FIG. 2.

FIG. 7 illustrates a more detailed block diagram of the preamble matched filter 130. The preamble filter 130 provides a second stage of matched filtering of input signal 72. The preamble detection circuit 130 is used for detection of the interrogator preamble and to provide synchronization for data detection. In the preferred embodiment, the preamble detection is performed entirely digitally. The analog outputs from the video processing circuit means 92 and 94 are A/D converted in converters 122 and 124 and coupled to a digital differencing circuit 198. The B-channel signal is delayed (approximately one time slot, see waveform 224, FIG. 9) with respect to the A-channel signal and then the difference is formed. In this way, convolution peaks in the A and B channels do not cancel each other, but any common-mode noise or jamming cancels out. The bipolar output (see waveform 226, FIG. 9) of digital differencing circuit 198 is coupled by conductor 200 to a preamble amplitude correlator 202; correlator 202 is a 15-tap transversal filter. Fifteen taps are required to correspond to the 15 bits of preamble information (illustrated in FIGS. 3 and 8). As noted herein above, with a 20 MHz sampling rate, approximately 100 samples of amplitude are taken for each bit of information, thereby requiring 15×100=1500 words of storage in correlator 202. Fifteen taps 204 are taken from correlator 202 and multiplied by the tap weights 206 which are the sign of the stored signals of the preamble code (in other words, a +1 corresponds to a "1" and a −1 corresponds to a "0"). In other words, the tap weights are matched to the preamble code. The outputs of the taps are summed in summer 208. The preamble amplitude correlator 202 output peaks when the incoming preamble is aligned with the appropriate time slot. The sidelobe suppression matched filter 132 operates in the same manner as preamble match filter 130 but is used to process the control (or ISLI) signal. Also in a similar manner, the tap weights are matched to the control signal code.

Figure 8:
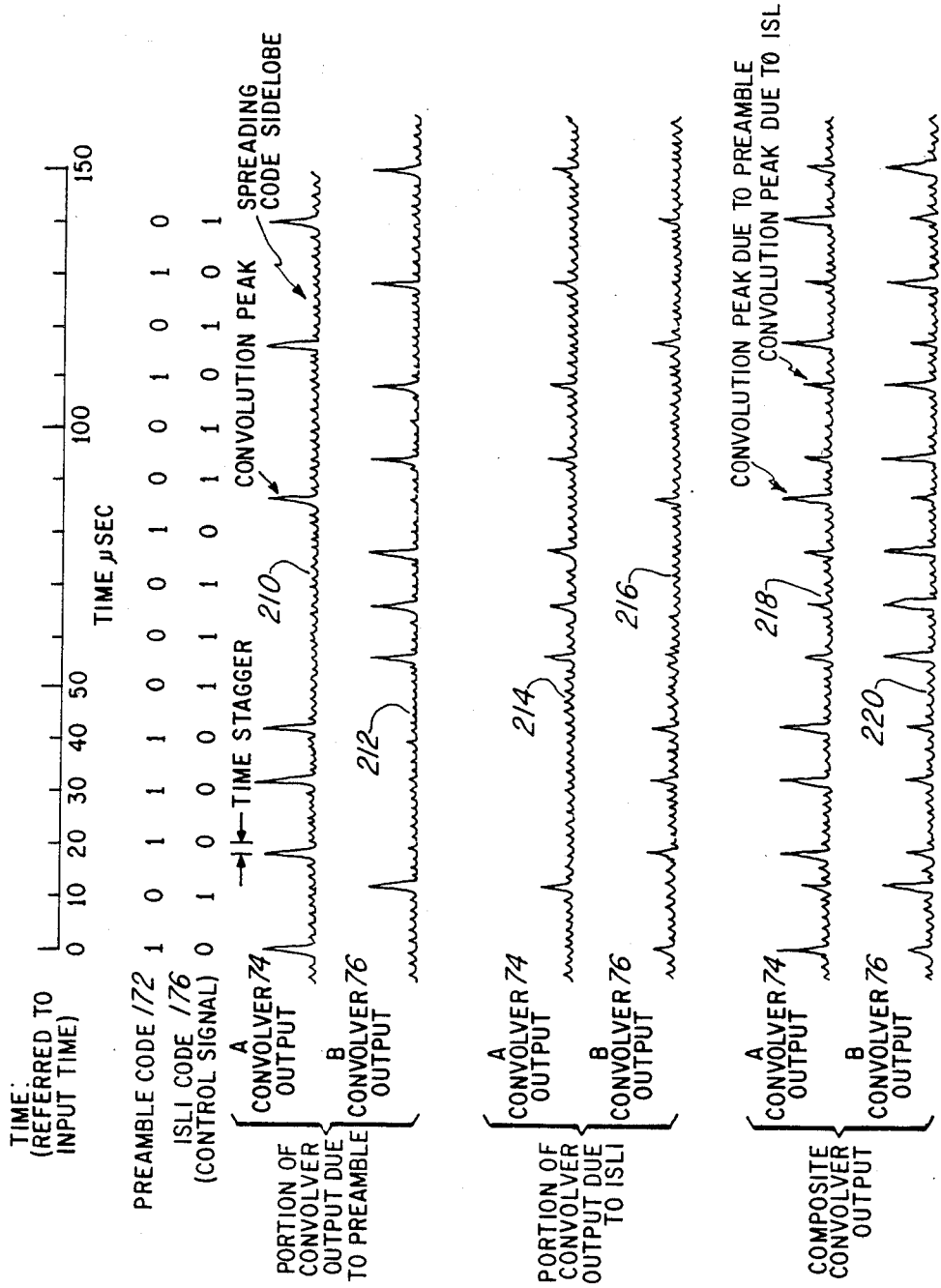
FIGS. 8 and 9 represent waveforms at various points in the receiver of FIG. 2.
Figure 9:
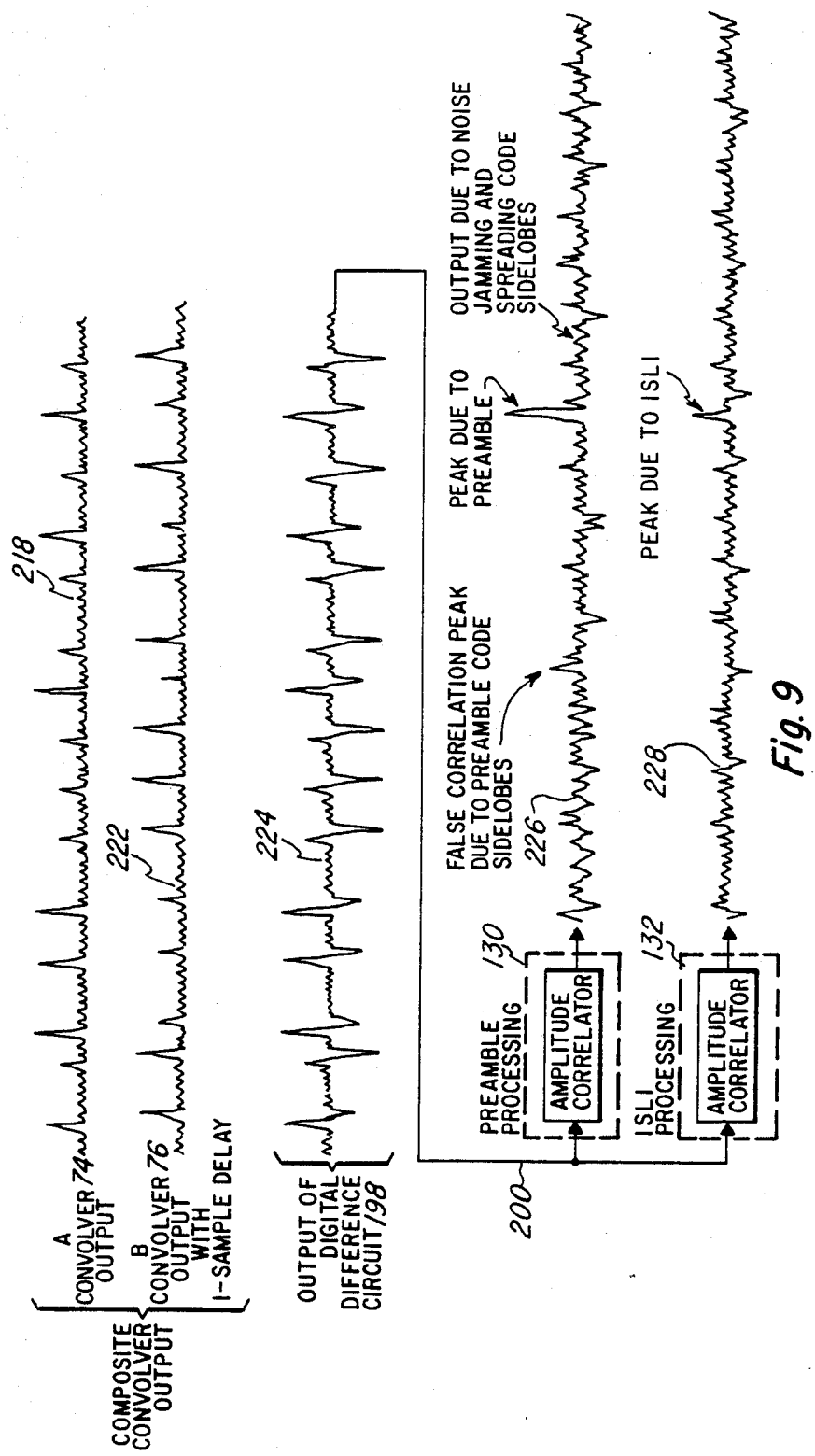

FIGS. 8 and 9 illustrate additional waveforms present at various points in receiver 70. The preamble 172 and control (or ISLI) code 176 are assumed to be the same as illustrated in FIG. 3. Waveforms 210 and 212 illustrate the portion of the outputs of convolvers 74 and 76 due to the preamble code 172. Waveforms 214 and 216 illustrate the portion of the outputs of convolvers 74 and 76 due to the control (or ISLI) code 176. Waveform 218 represents the composite of waveforms 210 and 214 while waveform 220 represents the composite of waveforms 212 and 216.

FIG. 9 illustrates waveform 222 (the B convolver output) delayed 1 sample length (versus waveform 220, FIG. 8). Waveform 224 represents the bipolar output of digital difference circuit 198. Waveform 226 represents the output waveform from preamble detection circuit 130 while waveform 228 represents the output waveform of sidelobe suppression detection circuit 132.

Figure 10:
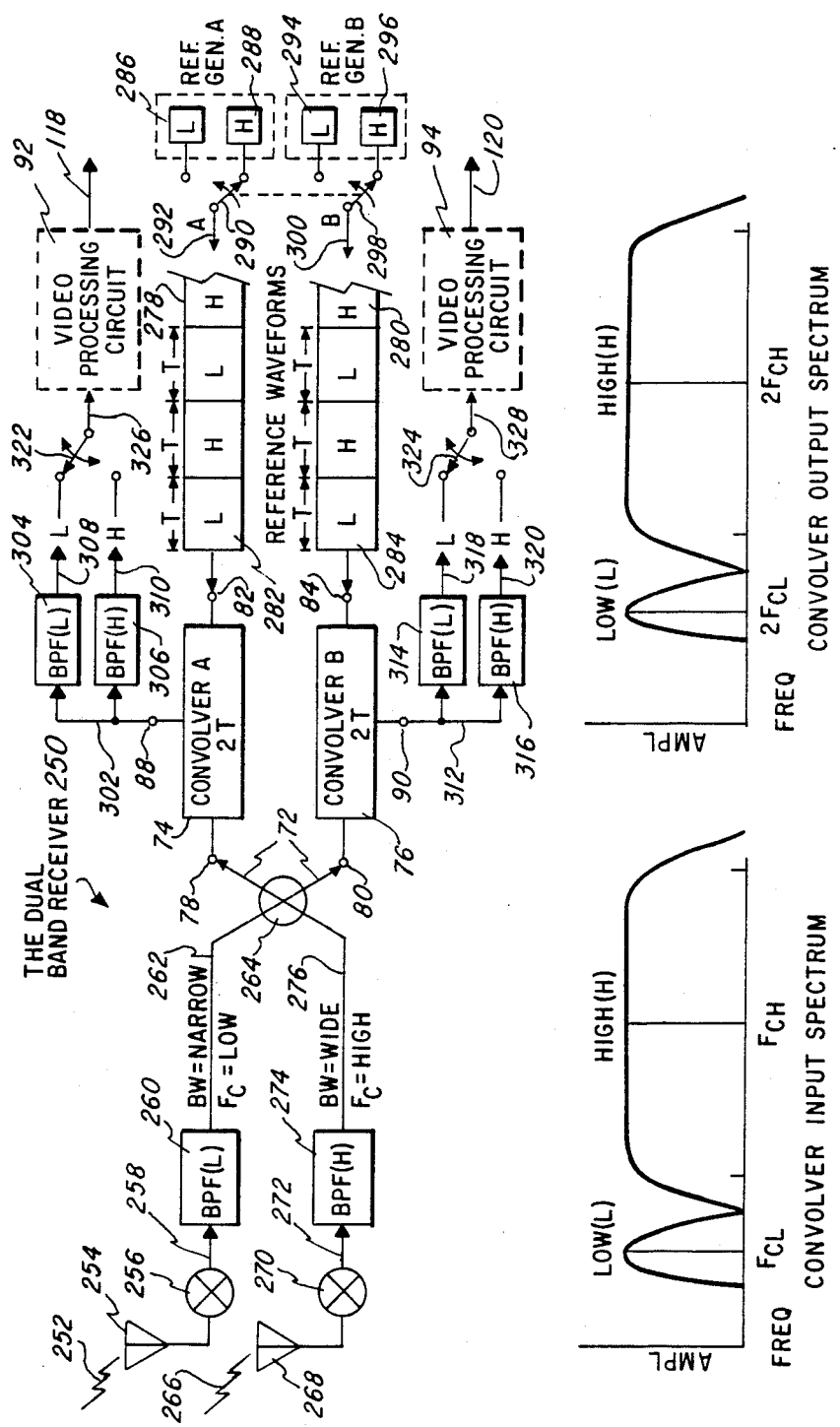
FIG. 10 illustrates a dual band receiver constructed according to the present invention.

FIG. 10 illustrates the dual band receiver 250 constructed according to the present invention. Receiver 250 is used in a spread spectrum burst communication system, such as the IFF system 10 disclosed in FIG. 1, where it is necessary or desirable to be able to simultaneously receive messages at two distinct carrier frequencies, such as a low (L) carrier frequency and the second at a high (H) carrier frequency, using distinct code and for the corresponding transponder transmitter to reply in the frequency band received. This capability is desirable in environments where enemy anti-jamming is likely in one band or both, to effect peace time/war time waveform changes, to provide interoperability between communicators who prefer operation at different frequencies, or to allow a system to operate in various geographical areas where frequency allocations cannot be obtained for one of the bands. In other words, the design of receiver 250 is valuable when it is desirable to be able to communicate in one of two bands, using the same or different codes, and the receiver does or does not know which band is going to be used. This dual band capability can be added to a single band receiver for minimal additional cost.

A dual band transponder capability is particularly useful in situations where communication systems are being upgraded requiring operational compatibility between existing equipment and newly developed higher performance equipment. A new frequency band allowing much larger bandwidth than the existing allocation may be approved for the upgrading of an existing communication function. This larger bandwidth would allow signals to be developed which have improved performance against enemy jamming and against mutual interference. Retrofitting platforms using the existing equipment operating at a different band may prove to be very expensive since antenna, radome and wiring modifications would typically be required. The dual band transponder provides a low cost solution to the problem of transitioning from the existing lower performance system to the upgraded system since it allows the upgraded system to be fielded on new or existing platforms where higher performance is a requirement and allows the existing system to remain on existing platforms requiring less performance.

The receiver 250 utilizes much of the circuitry illustrated and described with respect to the receiver 70 in FIG. 2 and like numerals have been used to describe like parts between the receivers of FIG. 2 and FIG. 10.

Receiver 250 in FIG. 10 is useful in an IFF system 10 (such as is illustrated in FIG. 1) when an airplane 12 and an airplane 54 have interrogators which are operating at different frequencies; for example, transmitter 16 in airplane 12 may transmit an interrogation signal at a carrier frequency in the L band region of the spectrum (L) whereas the transmitter 58 of airplane 54 may transmit an interrogation signal 64 at a higher carrier frequency (H), such as in the S-band region of the frequency spectrum. Assuming that both airplanes 12 and 54 are friendly airplanes, then it would be necessary that the transponder receivers in airplanes 24–28 be capable of detecting and responding to both incoming signals from airplanes 12 and 54 to identify themselves as friendly airplanes. This can be done in transponder receiver 250 illustrated in FIG. 10.

An incoming coded multibit L-band input signal 252 is received on an L-band antenna 254 and down-converted from an r.f. signal to an i.f. signal in mixer 256. The output signal from mixer 256 on conductor 258 is band limited in bandpass filter 260. The output of bandpass filter 260 on conductor 262 is coupled to power combiner and divider 264.

In like manner, incoming coded multibit H-band signal 266 is detected by H-band antenna 268 and transmitted to mixer 270 where the r.f. input signal 266 is down-converted to an i.f. output from mixer 270 on conductor 272. The output of mixer 270 is band limited by bandpass 274, the output of which is coupled on conductor 276 to power combiner and divider 264. The combined L and H band incoming I.F. coded multibit signal on conductor 72 is coupled to the input ports 78 and 80 of convolvers 74 and 76, respectively. The amplitude versus frequency of the input signals to convolvers 74 and 76 is illustrated in the graph on the lower left side of FIG. 10. In the preferred embodiment, the frequency band of the L-band carrier (which is centered at $F_{cL}$); does not overlap the frequency band of the higher (H) carrier frequency (centered at $F_{cH}$); this is desirable so that when convolution occurs between the L-Band reference and the H-Band signal or between the H-Band reference and the L-Band signal, there is not resulting output from the convolvers. This will be explained later.

Reference signals 278 (reference signal A) is input to reference port 82 of convolver 74 and reference signal 280 (reference signal B) is input to reference port 84 of convolver 76. Reference signal 278 and 280 each consist of alternating L- and H-band coded data bits to achieve dual band asynchronous operation. As is illustrated, each reference signal 278 and 280 have alternate L- and H-band carrier signals, such that each L- or H-band signal operates at a 50% duty cycle and each has a bit length equal to T, where T is the symbol length of the message or, in a two convolver system, the symbol length T equals one bit length. It should be noted that the coded bits in the L-and of reference A are orthogonal to the coded bits in the L-band of reference B; similarly, the coded bits in the H-band of reference A are orthogonal to the coded bits in the H-band of reference B. In other words, if the coded bit in time slot 282 in reference A is a "1", then the coded bit in time slot 284 in reference B will be a "0".

Reference generator A is comprised of an L-band generator 286 and an H-band generator 288 and switching means 290 for alternately switching between generators 286 and 288 every T time period. The output conductor 292 from reference generator A is coupled to reference port 82.

Similarly, reference generator b is comprised of an L-band generator 294 and an H-band generator 296 which is alternately switched by switch 298 between generators 294 and 296 to form the reference B signal 280. The output from switch 298 is coupled to conductor 300 to the reference port 84 of convolver 76.

The output port 88 of convolver 74 is connected by conductor 302 to bandpass filters 304 and 306; filter 304 rejects the high frequency carrier band while filter 306 rejects the low frequency carrier band, thereby providing a full correlated i.f. multibit signal L and H on conductors 308 and 310, respectively.

In like manner, the output port 90 of convolver 76 is connected to conductor 312 which is input to bandpass filters 314 and 316; filter 314 rejects the high frequency carrier band while filter 316 rejects the low frequency carrier band from the output of convolver 76 on conductor 312. The outputs from filters 314 and 316 appear on conductors 318 and 320, respectively, and produce an i.f., full correlated multibit low frequency (L) carrier and high frequency (H) carrier signal on conductors 318 and 320.

Switching means 322 and 324 multiplex the bandpass filter outputs from convolvers 74 and 76. The multiplexing is performed at a clock rate equal to T, the symbol length. Switches 322 and 324 are connected simultaneously to conductors 308 and 318 when switches 290 and 298 are connected to the high frequency (H) generators 288 and 296 in reference generators A and B (the switch positions illustrated in FIG. 10). All four switches, 290, 298, 322 and 324, change positions simultaneously each T time. The output of switches 322 and 324 on conductors 326 and 328, respectively, are fed to video processing circuits 92 and 94. The outputs of video processing circuits 92 and 94 on conductors 118 and 120 are connected in the same manner as is illustrated in FIG. 2.

It should be noted from the graph in the lower right hand side of FIG. 10 that the frequency band as well as the center frequencies of the L and H carrier frequency band are doubled when traversing convolvers 74 and 76. In the ideal case, since the input frequencies into the convolver input do not overlap, the L and H frequency band illustrated in the convolver output will not overlap since there is no interaction between the H reference waveform and the L signal input or the L reference waveform and the H signal input; in other words, there is no degradation of either signal caused by the presence or requirement to process the other.

Figure 11:
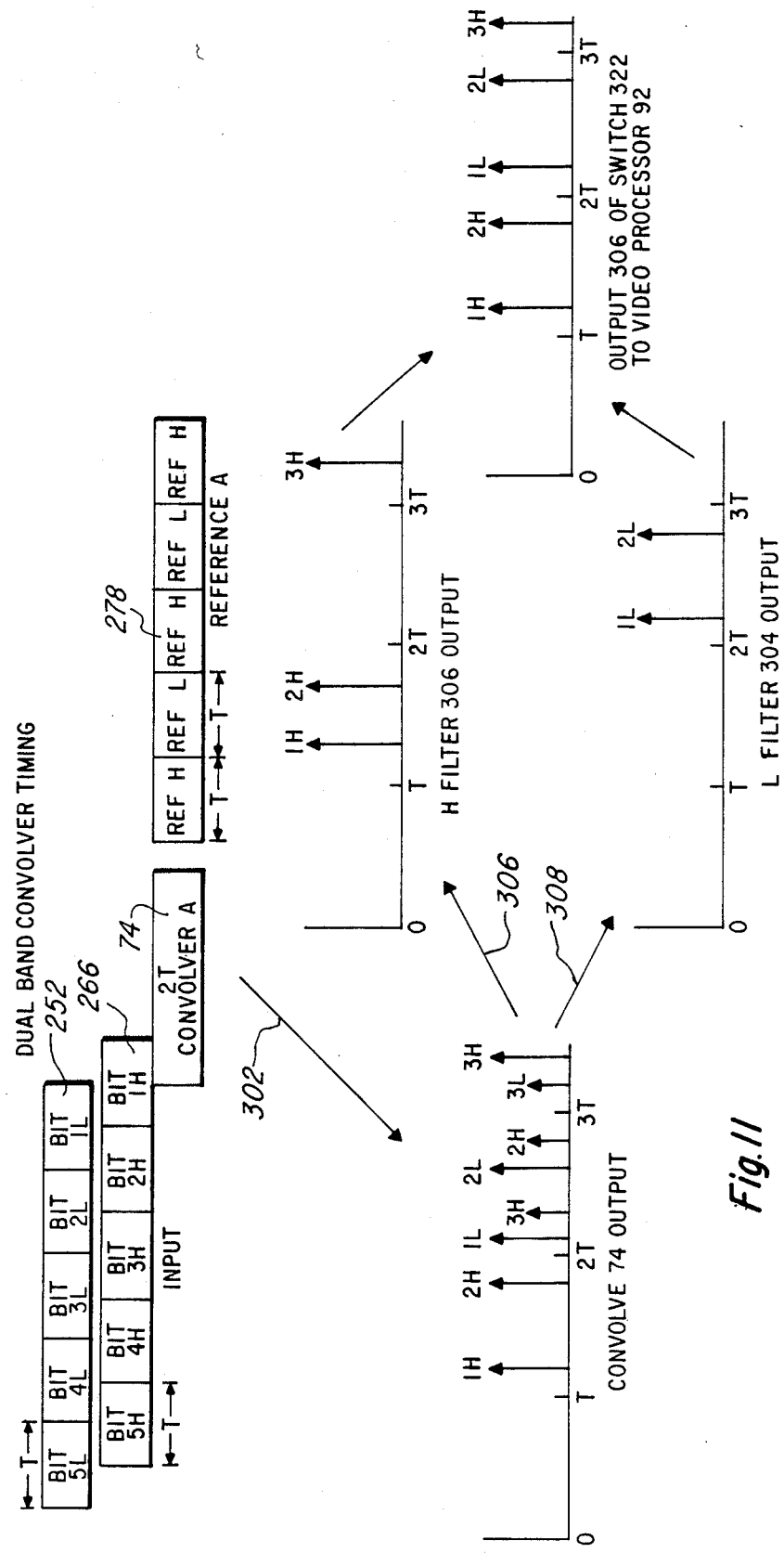
FIG. 11 illustrates the convolver timing and correlations for the dual band receiver of FIG. 10.

FIG. 11 illustrates the dual band convolver timing and correlation for the receiver system 250 illustrated in FIG. 10 and will be described for convolver 74 for illustrative purposes. Reference A signal 278 is shown as entering convolver 74 from the right while two multibit signals 252 and 266 are illustrated as entering the convolver from the left; signal 252 is operating at a first carrier frequency L while signal 266 is operating at a higher carrier frequency, H. As was mentioned with respect to FIG. 10, reference signal 278 is alternately coded with reference H and reference L, each operating at a 50% duty cycle for a time period equal to T; input signals 252 and 266 also each have a bit length equal to T. With this configuration, the dual band convolver 74 is capable of full asynchronous operation in processing waveforms in either the L-band or the H-band.

FIG. 11 illustrates this asynchronous operation for simultaneous reception of the L- and H-band messages 252 and 266. FIG. 11 illustrates the signal and reference bit stream at time t=0. At some later point in time, bit 1 in the H-band signal 266 and an H-band reference bit will exactly overlap in convolver 74 producing a correlation response labeled "1H" on the output (shown in the convolver 74 output graph in the lower left). One half bit period later, bit 2 in the H-band message 266 will overlap with the same reference bit, again producing a full correlation designated "2H" (in convolver 74 output graph in the lower left). At a time when the first L band reference bit is completely in convolver 74, a full correlation of bits 1 and 2 in the L-band message 252 (labeled "1L" and "2L" in FIG. 11) will occur. During this same time period, bit 3 of the H-band signal 266 will overlap with the H-band reference bit but results in a partial correlation because the overlap does not occur entirely within convolver 74. As the next H-band reference bit moves fully in convolver 74, an invalid partial correlation of bit 3 of L-band message 252 and the reference bit will occur. The stream of correlation pulses for the H- and L-band signals is shown in the timing diagrams. For a convolver 74 which has a convolution interval of 2T, where T is the symbol length and alternating reference bits such as is shown in reference signal 278, each L-and and H-band signal bit produces one and only one full correlation response. As can be seen in FIG. 11, the full correlation, valid responses in one band fall in the same time interval as the invalid partial correlations in the other band. The true correlation response can be separated from the invalid partial correlations using bandpass filters 304 and 306. In other words, observing the H filter 306 output graph and the L filter 304 output graph in the center of FIG. 11, it will be observed that the full correlations for bit 1H and 2H occur in the time period between T and 2T (while no full correlations occur in that same time period in the output of L filter 304). Contrastingly, the L filter output 304 shows a full correlation output of bit 1L and 2L during the time period between 2T and 3T whereas no H-band full correlations occur in the output of H filter 306. The output 306 of switch 322 is shown in the far right hand graph in FIG. 11. By alternating switch 322 between the filter 304 and 306 for a time period equal to T, two valid H-band correlation responses will pass and then by switching to the L-band filter 304 for a time period equal to T two valid L-band signals will pass. The switching time intervals are determined by the timing of the locally generated reference waveforms A and B and are independent of the time of arrival of received signals 252 and 266.

Accordingly, it can be seen that the output from convolver 74 (and 76) in FIG. 10 is separated in frequency and in time. The frequency separation is achieved by bandpass filters 304 and 306 (and 314 and 316). The time separation occurs because the reference waveforms A and B enter convolvers 74 and 76 at times which differ by the symbol length T. When the L-band reference is in the convolver entirely, the output from the convolver is the L-band portion of the spectrum and similiarly for the H-band. By utilizing the properties of the convolver 74 and 76 herein described above, dual band reception of overlapping messages can be received and processed by receiver 250 (illustrated in FIG. 10). The video processing circuits 92 and 94 and the remaining processing circuitry in receiver 250 is similar to that described with respect to receiver 70 in FIG. 2 and accordingly will not be described again in detail.

Although the present invention has been shown and illustrated in terms of a specific apparatus, it will be apparant that changes or modifications can be made without departing from the spirit and scope of the invention as defined by the appended claims.

What is claimed is:

1. A dual band communications receiver for receiving dual band overlapping multibit coded message input i.f. signals at a low (L) and high (H) carrier frequency, said messages comprised of synchronization and data information wherein one bit is of length T comprising, a reference signal generating means for producing a reference signal having alternate L and H band carrier signals, such that each L or H band signal operates at a 50% duty cycle and each has a bit length equal to T;

a convolver having a convolution interval of 2T, and an input port connected to receive said dual band multibit i.f. coded message, a reference port connected to the reference signal generating means for receiving the reference signal; and an output port producing a full correlated i.f. bit amplitude signal corresponding to said low or high frequency when said reference signal and a bit of information from said dual band coded input message exactly correlate and overlap in said convolver.

a signal processing means coupled to the convolver for receiving the output signal from the convolver for converting the dual band full correlated i.f. signal to a video signal, synchronization detection circuitry coupled to said signal processing means for detecting the time arrival of each message, and memory means coupled to said signal processing means and said synchronization detection circuitry for storing said messages when synchronization occurs.

2. A dual band receiver according to claim 1 wherein said synchronization detection circuitry includes means for detecting time stagger information from said message.

3. A dual band receiver acccording to claim 1 wherein said synchronization detection circuitry includes means for detecting preamble information from said message.

4. A dual band communications receiver for receiving dual band overlapping multibit coded message input i.f. signals at a low (L) and high (H) carrier frequency, said messages comprised of a preamble and data signal wherein one bit is of length T, comprising:
- a reference signal generating means for producing a reference signal having alternate L and H band carrier signals, such that each L or H band signal operates at a 50% duty cycle and each has a bit length equal to T;
- a convolver having a convolution interval of 2T, and an input port connected to receive said dual band multibit i.f. coded message, a reference port connected to the reference signal generating means for receiving the reference signal, and an output port producing a full correlated i.f. bit amplitude signal corresponding to said low or high frequency when said reference signal and a bit of information from said dual band coded input message exactly correlate and overlap in said convolver,
- a signal processing means coupled to the convolver for receiving the output signal from the convolver for converting the dual band full correlated i.f. signal to a video signal,
- preamble detection circuitry coupled to said signal processing means for detecting the time arrival of each preamble to provide synchronization and generation of a clock signal for each such preamble, and
- data processing and storage means coupled to said signal processing means and said preamble detection circuitry having a plurality of storage locations related to the number of overlapping messages such that the data signals from said signal processing means is entered into each of said storage locations as clock signals are generated by said preamble detection circuitry and provided to said storage locations.

5. A dual band receiver system for receiving dual band overlapping coded multibit message input i.f. signals at a low (L) and high (H) carrier frequency, said input signals comprising synchronization and data information on its sum pattern and a control signal on its difference pattern and having a bit time period equal to T, comprising:
  (a) at least two receiver channels A and B,
    (1) channel A comprising an i.f. frequency stage for producing a dual band i.f. representation of the coded multibit signals, a reference signal generating means for generating A reference signals having alternate L and H band carrier signals, such that each L or H band signal operates at a 50% duty cycle and each has a bit length of T, a first convolver having a convolution interval of 2T and having an input, reference and output port, said input port connected to the i.f. frequency stage for receiving the dual band i.f. representation of the coded multibit signals, the reference port coupled to the reference signal generating means for receiving the reference signal A having alternate L and H band carrier signals, such that each L or H band signal operates at a 50% duty cycle and each has a bit length of T, whereby said first convolver produces at its output port a dual band i.f. amplitude correlation of said dual band coded multibit input signal when said reference signal A and a bit of information from said coded input message exactly correlate and coincide in said first convolver,
    signal processing means coupled to said output port for converting said correlated dual band i.f. signal to a first video signal and producing its maximum amplitude during predetermined time intervals to form the output signal of channel A,
    (2) channel B comprising an i.f. frequency stage for producing a dual band i.f. representation of the coded multibit signals, a reference signal generating means for generating B reference signals having alternate L and H band carrier signals such that each L or H band signal operates at a 50% duty cycle and each has a bit length of T, a second convolver also having a convolution interval of 2T and having an input, reference and output port, said input port connected to the i.f. frequency stage for receiving the same signal as the input port of said channel A convolver, the reference port coupled to the reference signal generating means for receiving the reference signal B, having alternate L and H band barrier signals, such that each L or H band signal operates at a 50% duty cycle and each has a bit length of T, such that whereby said second convolver produces at its output port a dual band i.f. amplitude correlation of said dual band coded multibit input signal when said reference signal B and a bit of information from said dual band coded input message exactly correlate and coincide in said second convolver,
    signal processing means coupled to said output port for converting such dual band correlated i.f. signal to a second video signal and producing its maximum amplitude during predetermined time intervals to form the ouput signal of channel B,
  (b) processor means coupled to the channel A and channel B signal processing means for receiving the output signals of channels A and B for detecting, storing and de-interleaving said overlapping messages and including a plurality of memory locations, and
  (c) synchronization detection circuitry coupled to the channel A and channel B convolvers for receiving the output signals of channels A and B for identifying synchronization of said overlapping messages to establish time of arrival of said dual band overlapping coded multibit message input signals and produce signals selectively to said plurality of memory locations to transfer the data bits into selected memory locations.

6. A dual band receiver according to claim 5 wherein said synchronization information is preamble information and said synchronization detection circuitry is preamble detection circuitry.

7. A dual band receiver system according to claim 6 further including sidelobe suppression circuitry coupled to the channel A and channel B convolves for receiving the output signals of channels A and B, said sidelobe suppression circuitry producing an ouptut signal related to the magnitude of said control signal and which selectively inhibits the pulses from said preamble detection circuitry when the amplitude of the output from said preamble detection circuit has a predetermined relationship to the amplitude from the sidelobe suppression circuitry.

8. A dual band receiver system according to claim 7 further including means for varying the amplitude of the sidelobe suppression circuitry to thereby sharpen or broaden the response of said receiver system.

9. A dual band receiver system according to claim 5 wherein said first and second convolvers are surface acoustic wave convolvers.

10. A dual band receiver system according to claim 5 wherein said first and second signal processing means includes a log detector coupled to said convolver output, a peak detector coupled to said log detector and a sample-and-hold circuit coupled to said peak detector.

11. A dual band receiver system according to claim 10 further including a first analog-to-digital (A/D) converter coupled to the sample-and-hold circuit in said first processing means and a second analog-to-digital converter connected to the sample-and-hold circuit in said second processing means, the outputs of each of said A/D converters being input to a digital differencing circuit.

12. A dual band receiver system according to claim 11 wherein the output from said digital differencing circuit is coupled to said preamble detection circuit, said preamble detection circuit comprising an n-tap transversal filter, where n equals the number of bits in said preamble and having n-weighted taps which are matched to the preamble code.

13. A dual band receiver system according to claim 11 wherein the output from said digital differencing circuit is input to a preamble amplitude correlator having taps weighted to match the preamble code.

14. A dual band receiver system according to claim 11 wherein said digital differencing circuit is also input to a control signal amplitude correlator having taps weighted to match the control signal code.

15. A dual band receiver system according to claim 14 further including digital comparison means for comparing the amplitude outputs of said preamble and control signal correlators and generating timing signals when the correlator outputs have a predetermined relationship to one another.

16. A dual band receiver system according to claim 5 further including band pass filter means coupled to the output of each of the convolvers, said filter means comprising an L band pass filter for rejecting the H band frequencies and an H band pass filter for rejecting the L band frequencies to produce only i.f. full correlation L and H signals, respectively.

17. A dual band receiver system according to claim 16 further including switching means for multiplexing the output of said filter means to produce a composite i.f. full correlation L and H output signal.

18. A dual band IFF system comprising:
(a) a plurality of interrogators each comprising an interrogator transmitter and receiver, said interrogator transmitter transmitting a multibit coded message including synchronization and data information on the sum pattern and a control signal on the difference pattern, each bit being of length T, said message being transmitted at a low (L) or high (H) carrier frequency,
(b) at least one dual band transponder comprising a transponder transmitter and receiver, said dual band transponder receiver detecting and validating receipt of said message and control signal at said L or H carrier frequency and said transponder transmitter transmitting a unique message at a carrier frequency L or H corresponding to the carrier frequency detected by the transponder receiver in response thereto which is detected by said interrogator receiver, and
(c) said transponder receivers each comprising:
(1) a reference signal generating means for generating A and B reference signals having alternate L and H band carrier signals, such that each L or H band signal operates at a 50% duty cycle and each bit has a bit length of T,
(2) at least two receiver channels A and B, channel A comprising an i.f. stage for producing a dual band i.f. representation of the coded multibit signals, a convolver having a convolution interval of 2T and having an input, reference and output port, said input port connected to the i.f. frequency stage for receiving the dual band i.f. representation of the coded multibit signals, the reference port coupled to the reference signal generating means for receiving the reference signal A whereby said convolver produces at its output port a dual band i.f. amplitude correlation of said dual band coded multibit input signal when said reference signal A and a bit of information from said coded input message exactly correlate and coincide in said first convolver,
signal processing means coupled to said output port for converting such correlated dual band i.f. signal to a first video signal and producing its maximum amplitude during pre-determined time intervals to form the output signal of channel A,
Channel B comprising an i.f. stage for producing a dual band i.f. representation of the coded multibit signals, a convolver having a convolution interval of 2T and having an input, reference, and output port, said input port connected to the i.f. stage for receiving the same signal as the input port of said first convolver, the reference port coupled to the reference signal generating means for receiving the reference signal B, whereby said convolver produces at its output port a dual band i.f. amplitude correlation of said dual band coded multibit input signal when said reference signal B and a bit of information from said dual band coded input message exactly correlate and coincide in said convolver,
signal processing means coupled to said output port for converting such correlated dual band i.f. signal to a second video signal and producing its maximum amplitude during predetermined time intervals to form the output signal of channel B,
(3) processor means coupled to receive the output signals of channels A and B for detecting, storing and de-interleaving said overlapping messages and including a plurality of memory locations, and
(4) synchronization detection circuitry coupled to receive the output signals of channels A and B for detecting synchronization of said overlapping messages to establish time of arrival of said dual band overlapping coded multibit message input signals and produce signals selectively to said plurality of memory locations to transfer the data bits into selected memory locations.

19. A dual band IFF system according to claim 18 wherein said synchronization information is preamble information and said synchronization detection circuitry is preamble detection circuitry.

20. A dual band IFF system according to claim 19 further including sidelobe suppression circuitry in said transponder receiver coupled to receive the output signals of channels A and B, said sidelobe suppression circuitry producing an output signal related to the magnitude of said control signal and which selectively inhibits the pulses from said preamble detection circuitry when the amplitude of the output from said preamble detection circuit is of a predetermined magnitude with respect to the amplitude from the sidelobe suppression circuitry.

21. A dual band IFF system according to claim 19 wherein said first and second signal processing means includes a log detector coupled to the convolver output, a peak detector coupled to said log detector and a sample-and-hold circuit coupled to said peak detector.

22. A dual band IFF system according to claim 21 further including a first analog-to-digital (A/D) converter coupled to the sample-and-hold circuit in said first processing means and a second analog-to-digital converter connected to the sample-and-hold circuit in said second processing means, the outputs of each of said A/D converters being input to a digital differencing circuit.

23. A dual band IFF system according to claim 22 wherein the output from said digital differencing circuit is coupled to said preamble detection circuit, said preamble detection circuit comprising an n-tap transversal filter, where n equals the number of bits of said preamble, and having n-weighted taps which are matched to the preamble code.

24. A dual band IFF system according to claim 22 wherein the output from said digital differencing circuit is coupled to said sidelobe suppression circuit, said sidelobe suppression circuit comprising an n-tap transversal filter, where n equals the number of bits in said control signal, and having n-weighted taps which are matched to the control signal code.

25. A dual band IFF system according to claim 18 further including means for varying the amplitude of the sidelobe suppression circuitry to thereby sharpen or broaden the response of the transponder receiver system.

26. A dual band IFF system according to claim 18 wherein said first and second convolvers are surface acoustic wave convolvers.

27. A dual band IFF system according to claim 18 further including band pass filter means coupled to the output of each of the convolvers, said filter means comprising an L band pass filter for rejecting the H band frequencies and an H band pass filter for rejecting the L band frequencies to produce only i.f. full correlation L and H signals, respectively.

28. A dual band IFF system according to claim 27 further including switching means for multiplexing the output of said filter means to produce a composite i.f. full correlation L and H output signal.

* * * * *

UNITED STATES PATENT AND TRADEMARK OFFICE
CERTIFICATE OF CORRECTION

PATENT NO. :  4,910,521
DATED      :  Mar. 20, 1990
INVENTOR(S):  Donald W. Mellon, Plano, Texas It is certified that error appears in the above-identified patent and that said Letters Patent is hereby corrected as shown below:

Title page, item [22] should read as follows:
Filed: Aug. 3, 1981

Signed and Sealed this

Twentieth Day of August, 1991

Attest:

*Attesting Officer*

HARRY F. MANBECK, JR.

*Commissioner of Patents and Trademarks*